Patented Jan. 21, 1930

1,744,703

UNITED STATES PATENT OFFICE

FREDERICK K. LINDSAY, OF MINNEAPOLIS, MINNESOTA, ASSIGNOR TO ARIZONA MINERALS CORPORATION, OF YUMA, ARIZONA

PROCESS OF MAKING A WATER-SOFTENING MATERIAL OF THE EXCHANGE-SILICATE TYPE

No Drawing. Application filed February 19, 1925. Serial No. 10,418.

My invention relates to a new and useful process of making a water-softening material of the exchange silicate type.

Generally speaking hard water is water containing in solution more or less calcium or magnesium, or both. To soften this water it is necessary to remove the calcium and magnesium. This is done by passing the water through filter beds consisting of material which has the property of removing the calcium and magnesium by exchanging the same for some non-injurious soluble salt such as sodium.

When the filter bed has been employed for a certain length of time the surface of the water-softening material becomes saturated with the removed magnesium and calcium and such material is no longer effective for the purpose. It is then necessary to regenerate it, which is done by washing it with various substances, particularly sodium chloride brine.

A satisfactory water-softener should consist of material having a high exchange value per cubic foot in proportion to the amount of calcium and magnesium in the water. It must be insoluble in water, its particles should be hard to resist abrasion, and must be of such size that water flow is not impeded. The surface of contact with the water passing through beds of the material must be as great per cubic foot as possible, thus getting the maximum softening effect for a given flow of water. The softening material must be porous to increase to a maximum this surface contact; and it must be easily and cheaply regenerated.

As is well-known, when a sodium silicate solution is treated with solutions of salts of aluminum, of chromium or of many other soluble metal salts, such for example as sodium aluminate or sodium chromate, there will result a jelly-like substance designated by the term gel. This gel upon drying breaks up into small particles, and if used as a filter will exchange certain ions in the water subjected to it for the sodium of the gel. If these ions comprise the ions of magnesium or calcium, or both, the water is softened in that way. The degree of softening is dependent on the surface of the gel substance exposed as well as its porosity.

But these gels as ordinarily formed from drying having a tendency to pulverize and break up into exceedingly small particles which in a filter bed form muds, thus checking the flow of water through the filter bed, and also wash away during the water-softening operation and subsequently during the washing operation for its regeneration.

It is the object of my invention to treat these gels in such a manner that the objectionable characteristics above referred to which render the gels disadvantageous for use in water softening are eliminated.

I have discovered that if small hard particles of inert material are introduced into the mass of material just as gelation begins these particles will form neuclei upon which the gel will fix itself, so that when the material is dried and prepared according to the further steps of my process it will break up into particles of the right size, which are relatively dense and hard, which are porous, and which do not break down during their use in the water-softening filter bed or upon being washed for regeneration, so that there is no loss of material, and the water-softening properties of the gel are employed to the best possible advantage.

In connection with the drying operation I have found it advantageous to roll the particles of gel upon one another, preferably putting them in a rotating drum so that they are thus caused to roll upon one another during the later stages of drying. In this manner the corners and edges of irregular shaped particles which may be formed in the break-up by drying and which cause packing in the use of the material, are broken off, and rounded particles of more or less uniform size are produced, thereby giving the greatest surface for the volume of particles, avoiding packing and permitting easy flow of water in and through the apparatus in which the softener is used.

Specifically I practice my process for producing the water-softener device in the following manner, it being understood that I do not limit myself to the particular materials stated or to the exact proportions thereof, the specific method here given being a preferred form of practicing my process and exemplary thereof, but other materials and other proportions of materials may be used to give satisfactory results.

I add to two litres of sodium silicate, forty two degrees Baumé, an equal volume of water, and mix with it a solution of sodium aluminate made by dissolving two pounds of dry sodium aluminate (containing 29.5% $Al_2O_3$) in twenty eight litres of water. These solutions are stirred vigorously while brought together, thus retarding the formation of the resulting gel and tending to secure a homogeneous gel. At the same time and during this period of retardation very fine-grained and hard inert material, as a pure silica sand, is stirred into the slowly gelling mass. This is caught and held in suspension all the way through the material during the gelling action and until complete gelation. I use the term inert material herein as defining some material such as sand which when added to the gelling mass takes no part in the chemical reaction but is enclosed in the particles of gel without chemical change.

The gel thus formed is placed in shallow trays with very fine mesh screen bottoms and drained and dried at room temperature for about twelve hours which frees the gel of a considerable part of its water content slowly and easily. Thereafter it is further dried in a drying room where a current of warm air about sixty degrees centigrade is passed through it until it no longer feels soft and moist but will separate into particles without either crumbling or powdering on taking it in the hand. The last part of this drying operation is preferably accomplished by rolling the particles upon one another in revolving drums to form particles of generally spherical shape for the purpose above noted.

Drying to just the right point is important. If the material is not dried long enough the resulting product will pack easily into a mass in the water-softening apparatus retarding the flow of water to be softened. If it is dried too long the material will powder and on washing a great deal of it will be lost, due to its breaking down into such minute particles that it washes out. But by the use of the cores of inert particles the breaking down is to a large extent eliminated even if artificial drying progresses beyond the most effective point.

After the material has been dried and rolled it is thoroughly washed in order to dissolve away any soluble salts present therein. The solid inert material used may vary in amount from one to fifty per cent of the final dried product. It may be a variety of material, as ground minerals, either sea or river sand, or it may be any of the exchange silicates produced in such manner that they have become a fine powder. In practice I have found that about ten per cent of ground sea or river sand produces excellent results.

Other metal salts than sodium aluminate which may be used in the practice of my process are—aluminate sulphate, aluminate chloride, sodium chromite, chromous chloride, zinc sulphate, lead nitrate, ferrous chloride, ferrous sulphate, and stannus chloride.

I also can use in the practice of my process silica gel made by the treatment of sodium silicate with acids, and such silican gels when formed by the nuclei of hard solid material are sufficiently stable and permanent in form to give effective results.

I claim:

1. A process of making a water-softening material which consists in producing a gel material from a mixture of sodium silicate with a soluble salt of sodium and another metal, agitating this mixture, adding solid inert material to the same while the mixture is being agitated and at the time gelation has begun to take place, and after complete gelation drying the resulting product.

2. A process of making a water-softening material which consists in producing a gel material from a mixture of sodium silicate with a soluble salt of sodium and another metal, agitating this mixture, adding solid inert material to the same while the mixture is being agitated and at the time gelation has begun to take place, and thereafter drying the resulting product to a degree of dryness less than that which would produce pulvular granulation of the resulting gel particles.

3. A process of making a water-softening material which consists in producing a gel material from a mixture of sodium silicate with a soluble salt of sodium and another metal, agitating this mixture, adding solid inert material to the same while the mixture is being agitated and at the time gelation has begun to take place, and rolling the particles one upon the other during the last stages of drying.

4. A process of making a water-softening material which consists in producing a gel material from a mixture of sodium silicate with a soluble salt of sodium and another metal, agitating this mixture, adding solid inert material to the same while the mixture is being agitated and at the time gelation has begun to take place, after complete gelation has taken place draining the resulting gel, drying the same in trays slowly first with atmospheric air and then with artificially heated air, and continuing the drying to a point short of pulvular granulation of the gel.

5. A process of making a water-softening material which consists in producing a gel material from sodium silicate, agitating the gel material while still liquid, of adding solid inert material to the same during said agitation and at the time gelation has begun to take place, and after complete gelation drying the resulting product so as to form particles of gel having nuclei formed of said hard solid material.

6. A process of making a water softening material which consists in producing a gel material from a mixture of sodium silicate and sodium aluminate, agitating this mixture, adding thereto granular particles of silica or sand while the mixture is being agitated and at the time gelation has begun to take place, and after complete gelation drying the resulting product.

In testimony whereof I hereunto affix my signature.

FREDERICK K. LINDSAY.